United States Patent [19]

Eppley et al.

[11] Patent Number: 5,157,769
[45] Date of Patent: Oct. 20, 1992

[54] COMPUTER DATA INTERFACE FOR HANDHELD COMPUTER TRANSFER TO SECOND COMPUTER INCLUDING CABLE CONNECTOR CIRCUITRY FOR VOLTAGE MODIFICATION

[75] Inventors: Mark Eppley, Bothell, Wash.; Lawrence H. Berg, Murphy; John M. Olson, Grant Pass, both of Oreg.

[73] Assignee: Traveling Software, Inc., Bothell, Wash.

[21] Appl. No.: 860,293

[22] Filed: Mar. 26, 1992

Related U.S. Application Data

[63] Continuation of Ser. No. 383,215, Jul. 21, 1989, abandoned.

[51] Int. Cl.⁵ .................................... G06F 13/00
[52] U.S. Cl. .................................... 395/200; 395/275; 395/325; 395/500; 364/229.1; 364/DIG. 1
[58] Field of Search ............ 395/200, 275, 500, 325

[56] References Cited

U.S. PATENT DOCUMENTS

| | | | |
|---|---|---|---|
| 4,075,608 | 2/1978 | Koenig | 340/166 |
| 4,144,565 | 3/1979 | Bouknecht et al. | 364/200 |
| 4,217,624 | 8/1980 | Tuck | 361/394 |
| 4,527,079 | 7/1985 | Thompson | 307/475 |
| 4,598,410 | 7/1986 | Smith et al. | |
| 4,602,127 | 7/1986 | Neely et al. | 364/431.03 |
| 4,603,320 | 7/1986 | Farago | |
| 4,607,170 | 8/1986 | Wickman | |
| 4,631,698 | 12/1986 | Walsh et al. | 364/900 |
| 4,686,506 | 8/1987 | Farago | |
| 4,703,198 | 10/1987 | Porter et al. | |
| 4,739,502 | 4/1988 | Nozaki | |
| 4,845,381 | 7/1989 | Cuevas | |
| 4,852,041 | 7/1989 | Nakano | 364/900 |
| 4,853,560 | 8/1989 | Iwanmura et al. | |
| 4,884,287 | 11/1989 | Jones et al. | 375/121 |
| 5,023,824 | 6/1991 | Chadima et al. | 364/708 |

OTHER PUBLICATIONS

Macintosh, Apple Computer, Inc., 20525 Mariani Ave., Cupertino, CA 95014, pp. 10 & 11, copyright 1983.
"Motorola Semiconductor Technical Data", Motorola Telecommunications Device Data, pp. 2–428 to 2–434.
"Motorola Semiconductor Technical Data", Motorola, Inc., 1985, one page.

*Primary Examiner*—Lawrence E. Anderson
*Attorney, Agent, or Firm*—Christensen, O'Connor, Johnson & Kindness

[57] ABSTRACT

Disclosed is a computer data interface (6) for connecting a handheld computer (4) and a desktop computer (2). The computer data interface includes a cable (8) having connectors (10 and 12) at each end thereof. Mounted in one of the connectors is an adapter circuit for receiving data signals from the handheld computer and transmitting the signals to the desktop computer at a voltage levels compatible with the desktop computer. Similarly, the adapter circuit receives signals from the desktop computer and transmits the signals to the handheld computer at voltage levels compatible with the handheld computer. The adapter circuit is powered by the desktop computer to prevent draining the batteries of the handheld computer.

1 Claim, 3 Drawing Sheets

COMPUTER DATA INTERFACE FOR HANDHELD COMPUTER TRANSFER TO SECOND COMPUTER INCLUDING CABLE CONNECTOR CIRCUITRY FOR VOLTAGE MODIFICATION

This application is a continuation application based on prior copending application Ser. No. 07/383,215, filed on Jul. 21, 1989 now abandoned.

FIELD OF THE INVENTION

This invention relates generally to means for transferring data between computing devices, and, more specifically, relates to improvement in means for transferring data between larger computer devices and smaller devices.

BACKGROUND OF THE INVENTION

There are now available from various sources handheld computer devices having substantial memory capability as well as displays. These handheld devices very frequently prestore certain data such as date and time information, and are programmed to perform selected arithmetical functions. Some of these devices have the capability of transmitting and receiving data from larger computers and to permit that to be done, can be purchased with or are provided with such interface devices.

Those interface devices, for the purposes described above, and known to the applicants, are relatively bulky and may not be completely convenient to use for they are relatively bulky and/or require operating power from an external source.

Therefore, it is an object to provide novel interfaces useful for transferring data between computing devices of different sizes which interfaces are relatively compact and convenient to use.

A particular situation that must be dealt with is that usually one computer is connected to another device and the communication voltage levels of the two devices are different.

Therefore, it is a further object of this invention to provide a novel data interface that can receive data transmitted at a first voltage level from one device and supply at a second voltage level to a second device.

As will be appreciated, handheld computing or calculating devices are typically battery powered and to the extent that any device interfacing it with a larger computer draws on the batteries for power the operating life of the batteries is reduced.

Thus, it is another object of this invention to provide a novel data interface which utilizes the power supplied by a larger computer for its operation.

SUMMARY OF THE INVENTION

The foregoing objects are achieved by the provision of circuits for receiving and transmitting data between different computers or calculating devices. The circuits are miniaturized so that they can be mounted in one of the connectors at the ends of cables carrying the data between the two devices deriving their operating power from the larger computer device. Various embodiments of circuits can be used depending on the devices desired to be connected.

BRIEF DESCRIPTION OF THE DRAWINGS

The invention itself is set forth in the claims appended hereto and forming a part of this application, while an understanding of embodiments thereof may be had by reference to the detailed description taken in conjunction with the drawings in which:

DETAILED DESCRIPTION OF THE PREFERRED EMBODIMENT

Figure 1:
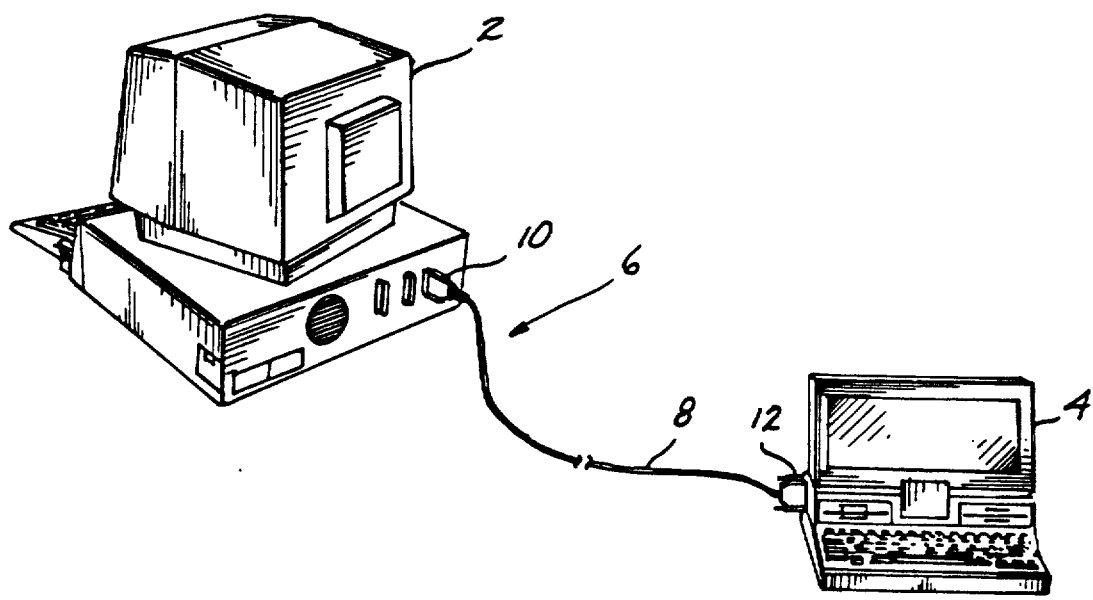
FIG. 1 illustrates generally how an interface device in accordance with the invention may be used.

FIG. 1 illustrates how the interface of the invention may be used. A desktop or relatively large computer 2 is connected to a relatively small handheld computer or calculating device 4. Each may have the usual display and keyboard and include the usual memories, stored programs, and processing elements.

A data interface 6 in accordance with the invention interconnects the device 4 with the computer 2 and includes a cable 8 provided with terminals or connectors 10 and 12 at each end.

Mounted either entirely in one of or partially in both of the connectors so as to provide a compact, easy to manipulate and store device, is an adaptor circuit for transmitting data signals to and from the first device at a first and higher voltage level and transmitting like signals to and from the smaller device at a second and lower voltage level. As will be seen, the circuits derive their operating voltages from the larger device connected to a generator source thus eliminating any additional drain on the batteries in the handheld device.

Figure 2:
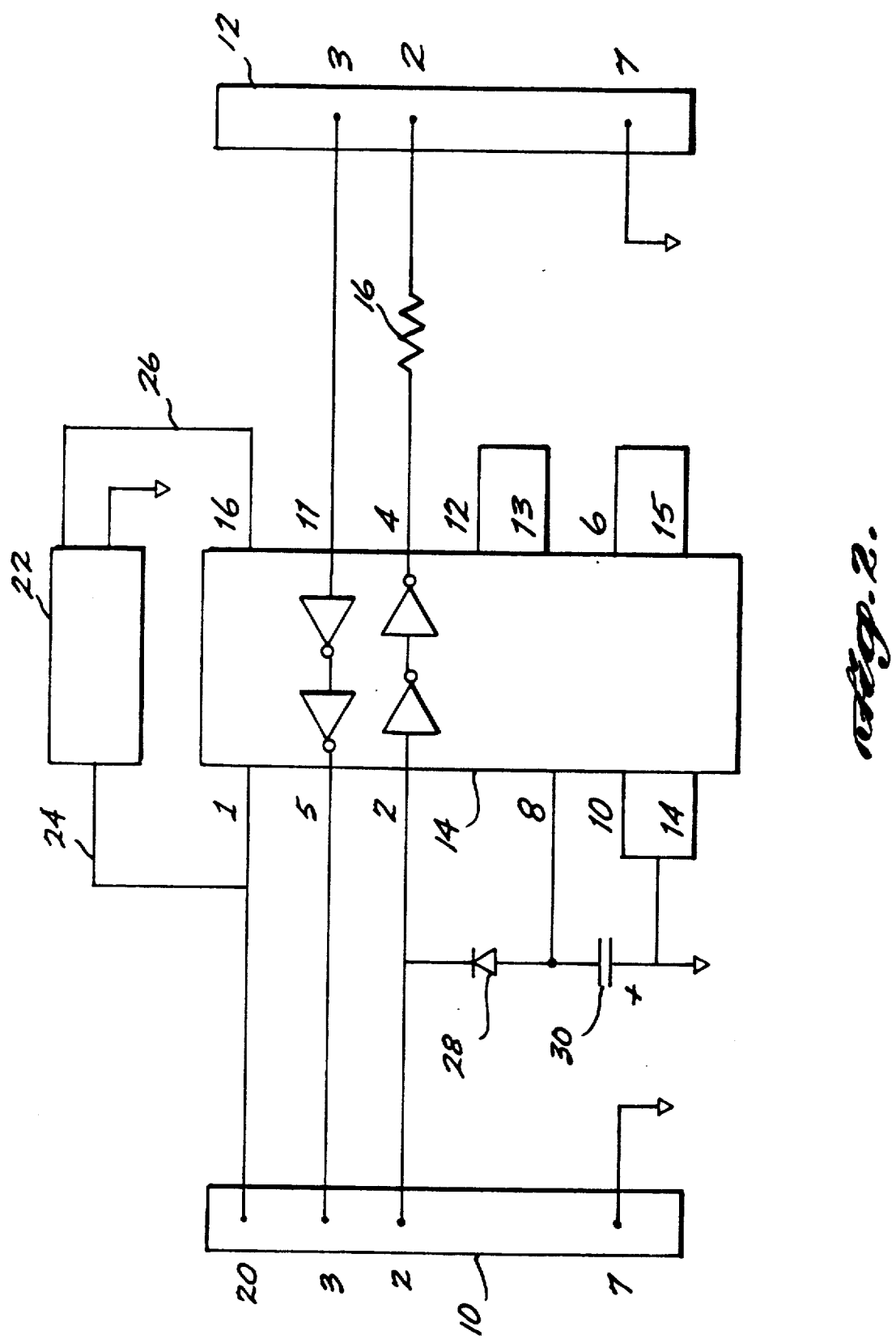
FIG. 2 is a schematic illustration of an embodiment of a circuit in accordance with the invention.

In FIG. 2, selected pins in terminal 10 are indicated by the numbers 20, 3, 2, and 7. Connected to input pin 3 and output pin 2 is a driver/receiver 14, a commercially available integrated circuit capable of receiving signals at a relatively high level and transmitting them at a lower level and likewise capable of receiving signals at a lower level and transmitting them at a higher level. One such device is the Motorola MC145406 which will transmit and receive signals at the voltage levels established by the RS-232-C standard established by the Electronics Industry Association, and will also transmit and receive signals at a level established by an applied reference signal. It should be understood that in the typical handheld device the signal levels may vary depending on the battery strength at any one time. Typically, these signals will fall in the range of 3 to 6 volts so any data signals from the handheld device will be increased to either 12 volts positive or 12 volts negative by the driver/receiver 14 for transmission to the desktop 2. Signals to be transmitted to the handheld device 4 will transmit at the reference lower level.

The connections to the driver/receiver thus include one from the pin 2 of the connector 10 to a pin 2 of 14, its data signal input. Another is one from input pin 3 of the connector 10 to the output 5 of 14. Others therefore include an input from pin 3 of the connector 12 to the pin 11 of 14 and an output from pin 4 of 10 through a current limiting resistor 16 to the pin 2 on the connector 12. A positive voltage source to 14 is provided from pin 20 of connector 10 to pin 1 of 14.

In order to provide output data signals from 14 to the handheld computer, a regulated lower level voltage, for instance 5 volts, is supplied to the pin 16 of the driver/receiver 14 by the voltage regulator 22 having an input 24 from the pin 20 of connector 10 and an output 26 to pin 16. Thus, in the illustrated embodiment, pin 2 of the connector 10 supplies data signals at plus or minus 12 volts to pin 2 of 14, and those signals are supplied at a 5 volt level in turn to the pin 2 of connector 12.

This is achieved in part by the provision a negative power source constituted by the diode 28 poled with its cathode connected to the pin 2 of connector 10 and its anode connected to a capacitor 30 connected on the other side to ground with the junction of the two connected to pin 8 of the driver/receiver 14. Thus, when pin 2 of connector 10 goes negative, the capacitor 30 charges through diode 28 and a negative voltage is supplied to pin 8 of 14. Transitions between positive and negative voltage are supplied as data from pin 4 of the driver/receiver to pin 2 of the connector 12.

When data is to be transmitted from the smaller to the larger device, that data is transmitted from the pin 3 on the connector 12 to pin 11 on the driver/receiver 14. That data is transmitted from pin 5 of the driver/receiver to pin 3 of connector 10 at the voltage level required by the large computer supplied at pins 1 and 8 of 14.

The circuit as may be seen is powered by the larger computer deriving its power, of course, from any normal electrical outlet. Thus, no drain is added to the batteries in the smaller device. Further, as stated above, the circuit is miniaturzed and housed completely within one or both of the connectors to provide a compact, easily manipulated stored device.

The circuit described is one that is particularly adapted to permit the receiving and/or transfer of data between a desktop computer and the "Wizard" pocket computer sold by Sharp Electronics. Another similar device that may be interfaced using the invention, is the Casio "B.O.S.S." as shown in FIG. 3.

Figure 3:
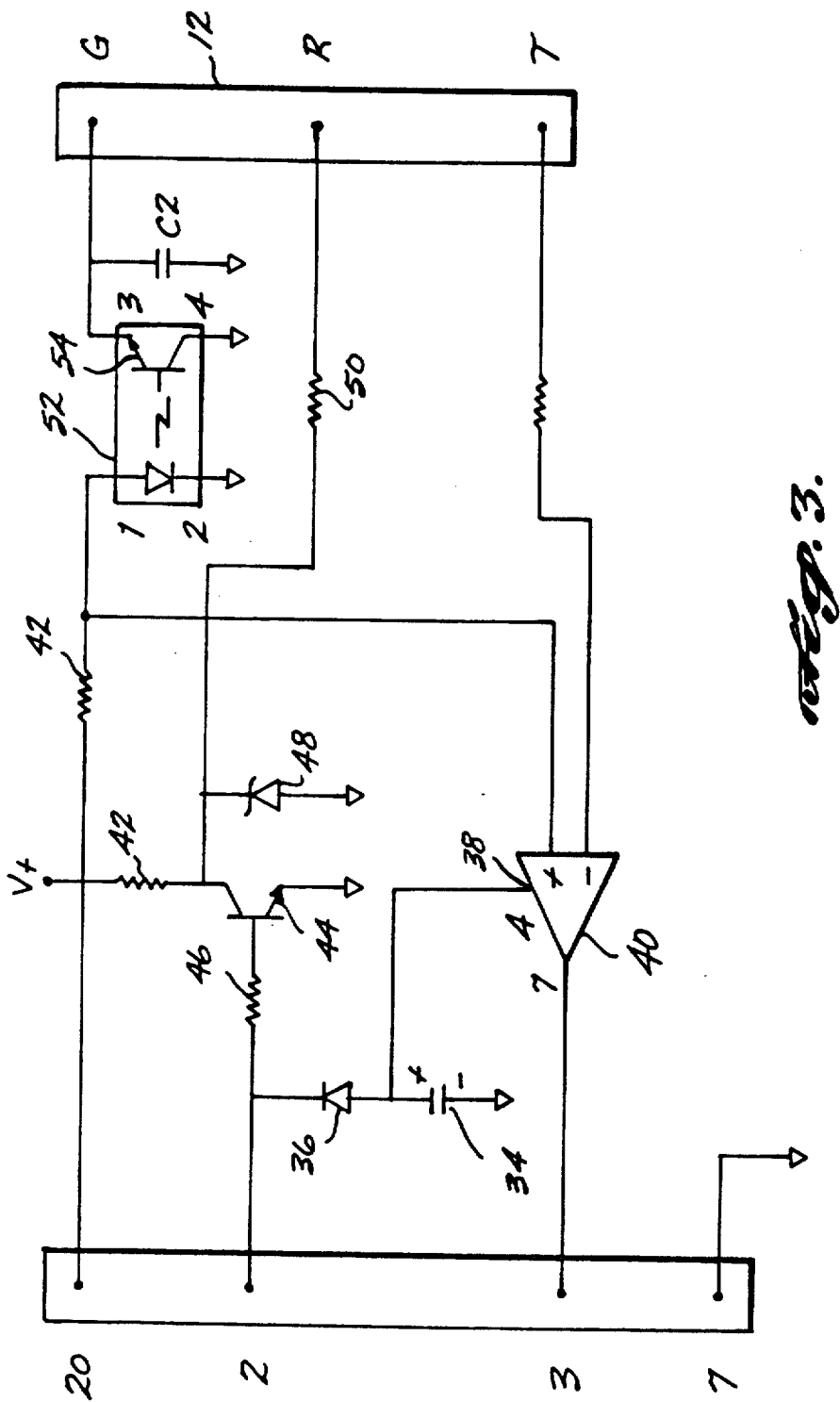
FIG. 3 is a schematic illustration of a second embodiment of a circuit in accordance with the invention.

In FIG. 3, the pins 20, 2, and 3 of 10 perform the same functions as before. Likewise, the capacitor 34 and diode 36 perform the same function as before, supplying a negative voltage at the pin 38 of the operational amplifier 40. This voltage is supplied at whatever level the larger device requires for communication. The reference voltage for the amplifier 40 is supplied to its pin 5 through a dropping resistor 42 connected to the source of positive voltage pin 20 of the connector 10. The value of the reference voltage is determined by the LED in 52. The other inputs to amplifier 40 are the data signals from the pin T of the connector 12. These signals are a level higher than the reference, that is, typically in the range of 3 to 6 volts positive typically and when present drive the pin 3 of the connector 10 at the positive voltage level established for the larger device. Thus, data is transmitted from connector 12 at a relatively low level voltage and is received at connector 10 at a higher level.

The transmission of data from the larger device to the smaller device in this embodiment is achieved through a transistor 44. This transistor having its base connected to the output pin 2 of connector 10 through the resistor 46 is turned on and off by the positive and negative data pulses from that pin. The output voltage at the collector transistor 44 is held to a maximum lower voltage by the zener diode 48 and is supplied through a current limiting resistor 50 to the terminal R of connector 12.

To prevent unnecessary drain of the batteries of the smaller device, an optical isolator 52 is provided. This circuit includes a light sensitive transistor 54. With a positive voltage at pin 20 of connector 10, the transistor is turned on and connects the ground pin G of the connector 12 to the circuit ground thereby enabling the circuit to function. If, however, the interface circuit is plugged into a smaller device but not into a larger device, the connector 12 is not grounded and no power will be supplied by the handheld device.

It should be understood that the signal voltage values and specific device identifications are given for exemplification purposes only as they may change to meet the requirements of specific devices to be interfaced. Likewise, changes in the circuitry may be made while still with the scope of the invention.

We claim:

1. A computer interface for interconnecting a handheld first computer deriving power from a battery source and a second computer deriving power from a generator source and for transmitting and receiving digital data between the first and second computers, each computer including a data transmitting element and a data receiving element, the computer interface comprising:

a cable having first and second cable connectors at its opposite ends whereby connections may be made to the first and second computers, respectively, for the transmission and reception of data by both computers;

pin means in each cable connector for connection to the data transmitting element and to the data receiving element of the respective computer;

circuit means mounted in one of the cable connectors, the circuit means comprising first circuit means for receiving first data signals from the first computer at a first voltage level compatible with the first computer and transmitting the first data signals to the data receiving element of the second computer at a second voltage level compatible with the second computer, the first and second voltage levels being different from one another;

said circuit means also including second circuit means for receiving second data signals from the second computer at the second voltage level and transmitting the second data signals to the data receiving element of the first computer at the first voltage level;

said circuit means comprising means for supplying operating power for the circuit means from the pin means of the second cable connector; and said first circuit means and said second circuit means are both contained within a single integrated circuit which is the Motorola (R) MC 145406 integrated circuit, the single integrated circuit being mounted in one of the cable connectors.

* * * * *